United States Patent
Bonwick et al.

(10) Patent No.: US 7,376,758 B2
(45) Date of Patent: May 20, 2008

(54) I/O DEPENDENCY GRAPHS

(75) Inventors: Jeffrey S. Bonwick, Los Altos, CA (US); William H. Moore, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 211 days.

(21) Appl. No.: 11/407,614

(22) Filed: Apr. 20, 2006

(65) Prior Publication Data
US 2007/0174494 A1 Jul. 26, 2007

Related U.S. Application Data

(60) Provisional application No. 60/733,380, filed on Nov. 4, 2005.

(51) Int. Cl.
G06F 9/46 (2006.01)
G06F 3/00 (2006.01)

(52) U.S. Cl. .......................... 710/5; 718/102; 717/125; 717/131

(58) Field of Classification Search ................ 710/5–7, 710/24, 29; 717/120–133; 718/100–102
See application file for complete search history.

(56) References Cited

U.S. PATENT DOCUMENTS

| | | | |
|---|---|---|---|
| 5,371,885 A | | 12/1994 | Letwin |
| 5,404,520 A | * | 4/1995 | Sonobe ........................ 718/101 |
| 6,167,521 A | * | 12/2000 | Smith et al. ................... 726/21 |
| 6,745,284 B1 | | 6/2004 | Lee et al. |
| 6,745,305 B2 | | 6/2004 | McDowell |
| 7,003,759 B2 | * | 2/2006 | Jameson ...................... 717/120 |
| 7,007,196 B2 | | 2/2006 | Lee et al. |
| 2002/0004883 A1 | | 1/2002 | Nguyen et al. |
| 2002/0161972 A1 | | 10/2002 | Talagala et al. |
| 2003/0033477 A1 | | 2/2003 | Johnson et al. |
| 2003/0145167 A1 | | 7/2003 | Tomita |
| 2004/0015929 A1 | * | 1/2004 | Lewis et al. ................. 717/156 |
| 2004/0107314 A1 | | 6/2004 | Kim et al. |
| 2004/0123063 A1 | | 6/2004 | Dalal et al. |
| 2004/0205726 A1 | * | 10/2004 | Chedgey et al. ............ 717/125 |
| 2005/0097270 A1 | | 5/2005 | Kleiman et al. |
| 2006/0048113 A1 | * | 3/2006 | Ozone et al. ................ 717/144 |
| 2007/0016740 A1 | * | 1/2007 | Somavarapu ................ 711/162 |
| 2007/0074177 A1 | * | 3/2007 | Kurita et al. ................ 717/131 |

OTHER PUBLICATIONS

Austin, B. "A Dynamic Disc Allocation Algorithm Designed to Reduce Frangmentation During File Reloading", Information Sciences Laboratory, Corporate Research and Development Center, General Electric Company, 4 Pages, 1970.
Goodheart, B., Cox, J. "The Magic Garden Explained", Prentice Hall, 8 Pages, 1994.
Stallings, W. "Computer Organization and Architecture: Designing for Performance", Prentice Hall, 4 Pages, 2000.

* cited by examiner

Primary Examiner—Christopher Shin
(74) Attorney, Agent, or Firm—Osha Liang LLP

(57) ABSTRACT

A method for executing a selected input/output (I/O) command from a plurality of I/O commands based on a dependency graph of I/O commands includes building the dependency graph of I/O commands, wherein the dependency graph is built by requiring all children of the selected I/O command to be ready before the selected I/O command is ready, and executing the I/O command based on the dependency graph, wherein execution of the selected I/O command is completed when all of the children of the selected I/O command finish execution.

17 Claims, 6 Drawing Sheets

I/O DEPENDENCY GRAPHS

CROSS-REFERENCE TO RELATED APPLICATIONS

This application claims benefit of U.S. Provisional Application Ser. No. 60/733,380 filed on Nov. 4, 2005, entitled "PIPELINED I/O EXECUTION, I/O DEPENDENCY GRAPHS, AND I/O PRIORITY INHERITANCE" in the names of William H. Moore and Jeffrey S. Bonwick.

BACKGROUND

In a computer system, Input/Output, or I/O, is made up of the collection of interfaces that different components (e.g., CPU, keyboard, mouse, monitor, etc.) use to communicate with each other, or the signals sent through these interfaces. Signals received by a component are inputs, and signals sent from the component are outputs. Output from one device is often taken as input to another, which allows different devices to be linked. I/O allows a person or other system to communicate with a computer and also allows devices within a computer to communicate with one another.

I/O may also refer to an input or output operation performed by one of these devices. Typical input devices include keyboards and mice, and typical output devices include monitors and printers. Modems and network cards, which provide communication between computers, are generally both input and output devices. Buses connect different computer components and can use the same set of wires to connect several peripherals. I/O is often transferred between devices using buses.

In computer architecture, any movement of information to or from the combination of the CPU and main memory (e.g., data transfer to or from a disk drive) is considered I/O. The CPU and supporting circuitry provide I/O methods that are used in low-level computer programming in the implementation of device drivers.

In operating a computer system, some I/O operations depend on one another. For example, data may have to be written to a device first before it is accessed by another device. Problems may occur if I/O operations are performed out of order. As a result, I/O operations in a system are often executed serially to ensure that they are performed in the right order. Doing so usually results in poor performance, as any multithreaded capabilities are not used. However, if dependency relationships between I/Os are known, then some I/Os can be executed in parallel in order to maximize throughput and minimize the overall latency in completing a large number of I/Os.

SUMMARY

In general, in one aspect, the invention relates to a method for executing a selected input/output (I/O) command from a plurality of I/O commands based on a dependency graph of I/O commands, comprising building the dependency graph of I/O commands, wherein the dependency graph is built by requiring all children of the selected I/O command to be ready before the selected I/O command is ready, and executing the I/O command based on the dependency graph, wherein execution of the selected I/O command is completed when all of the children of the selected I/O command finish execution.

In general, in one aspect, the invention relates to a system for executing a selected input/output (I/O) command from a plurality of I/O commands based on a dependency graph of I/O commands, comprising a file system configured to build the dependency graph of I/O commands, wherein the dependency graph is built by requiring all children of the selected I/O command to be ready before the selected I/O command is ready, and execute the I/O command based on the dependency graph, wherein execution of the selected I/O command is completed when all of the children of the selected I/O command finish execution.

In general, in one aspect, the invention relates to a computer usable medium having computer readable program code embodied therein for causing a computer system for executing a method for executing a selected input/output (I/O) command from a plurality of I/O commands based on a dependency graph of I/O commands, comprising building the dependency graph of I/O commands, wherein the dependency graph is built by requiring all children of the selected I/O command to be ready before the selected I/O command is ready; and executing the I/O command based on the dependency graph, wherein execution of the selected I/O command is completed when all of the children of the selected I/O command finish execution.

Other aspects of the invention will be apparent from the following description and the appended claims.

DETAILED DESCRIPTION

Figure 1:
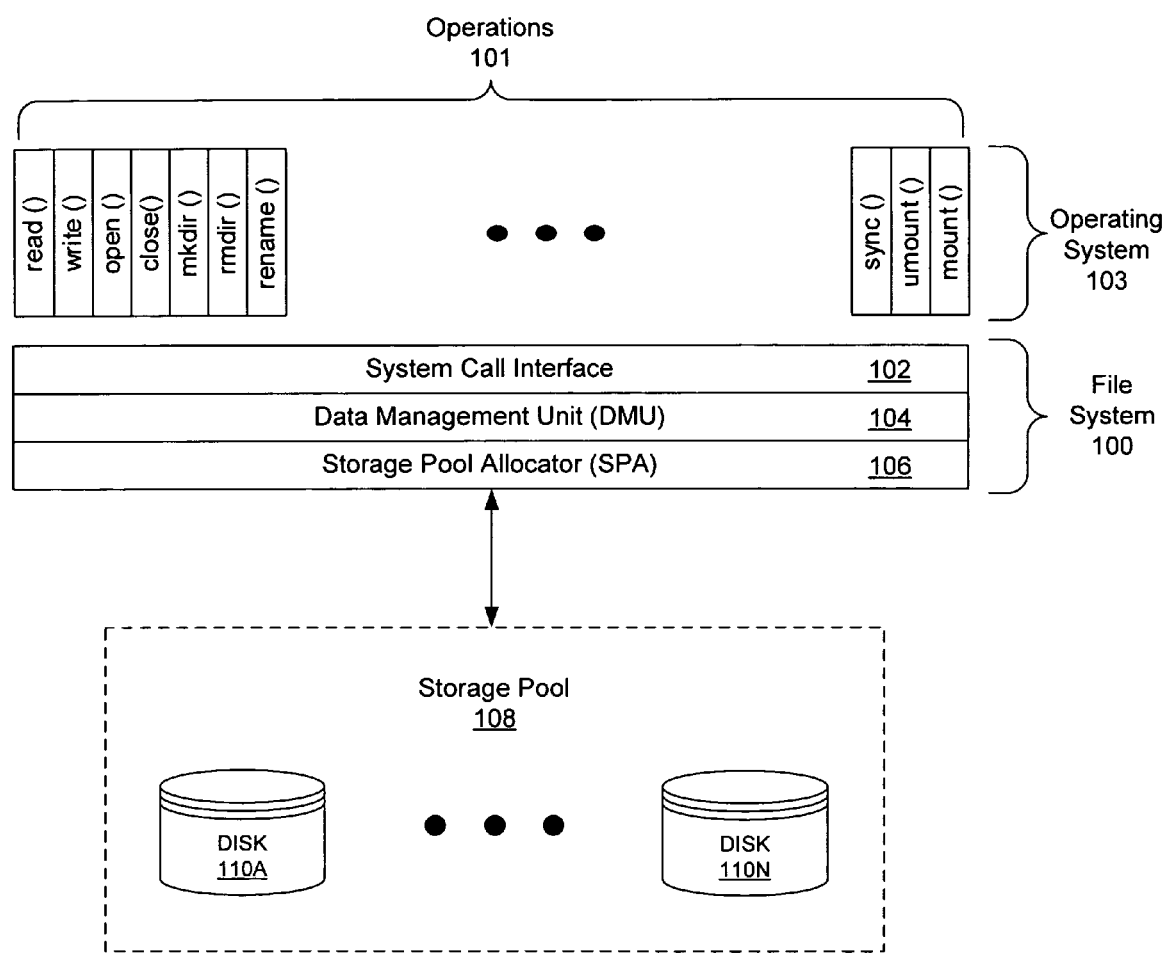
FIG. 1 shows a system architecture in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relates to a method and apparatus enabling parallel execution of I/O commands in a file system. More specifically, embodiments of the invention use an I/O dependency graph to aid in the scheduling and/or processing of I/O commands.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
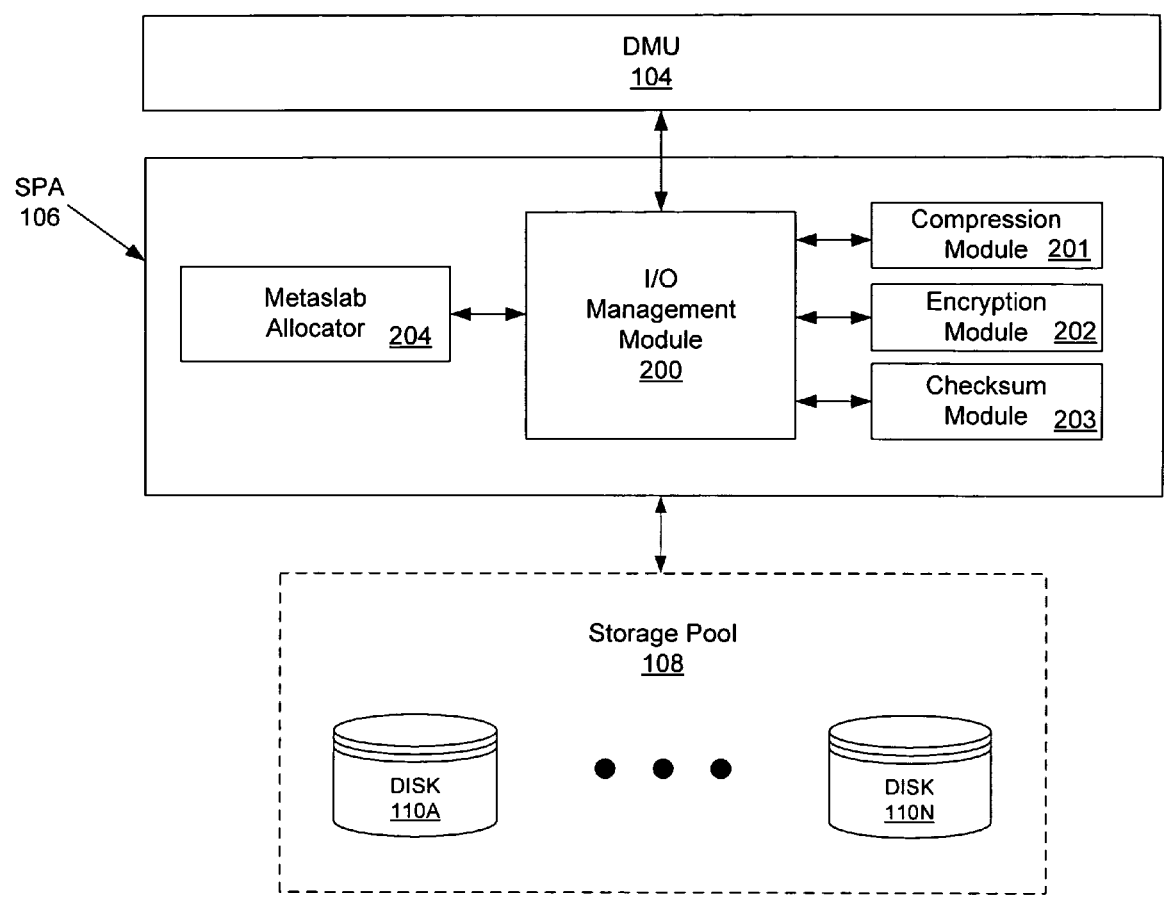
FIG. 2 shows a storage pool allocator in accordance with one or more embodiments of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules as described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
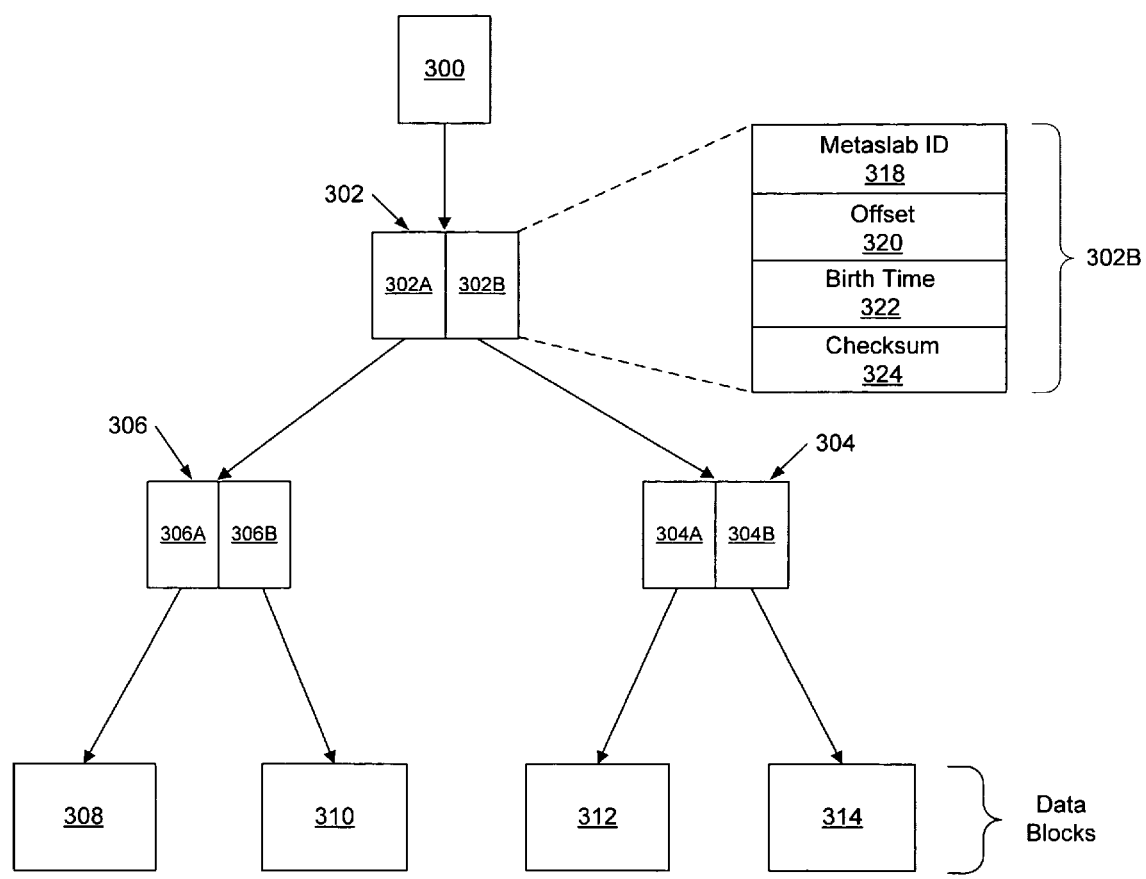
FIG. 3 shows a hierarchical data configuration in accordance with one or more embodiments of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth time (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where the disk the metaslab begins. The offset (320) may then be used to reference a particular segment within the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

In general, embodiments of the invention provide a method and apparatus for executing an I/O command based on a dependency graph of I/O commands. In one or more embodiments of the invention, the dependency graph may be used for pipelined execution to facilitate the operation of a file system, as described above and shown in FIGS. 1-3.

When dealing with large numbers of I/O commands, it is important to know the dependency relationship between these commands. Such information enables the file system (or related processes) to determine which ones can be executed in parallel to maximize throughput and minimize overall latency of completing the group of I/O commands. Without this information, correctness requires serial execution of I/O commands, which affects performance.

In one or more embodiments of the invention, each I/O command handled by a file system is able to reference other I/O commands on which it depends (i.e., its children) based on the structure of the file system as described above and shown in FIGS. 1-3. For example, within the file system, writing an indirect block requires that the blocks that the indirect block references all been written to disk first. This can continue for many levels, eventually creating a full I/O dependency graph, much like a tree. Accordingly, since this graph is essentially a directed acyclic graph (DAG) (i.e., a directed graph containing no cycles, meaning that if there is a route from node A to node B then there is no way back), each I/O command in this graph can be independently scheduled, executed, and waited upon, and only complete when both itself and all its children have finished execution. In one or more embodiments of the invention, the consumer of the I/O command typically builds the graph using interfaces. In one embodiment of the invention, the DMU is the consumer of the I/O commands. Alternatively, the SPA maybe the consumer of the I/O commands.

Figure 4:
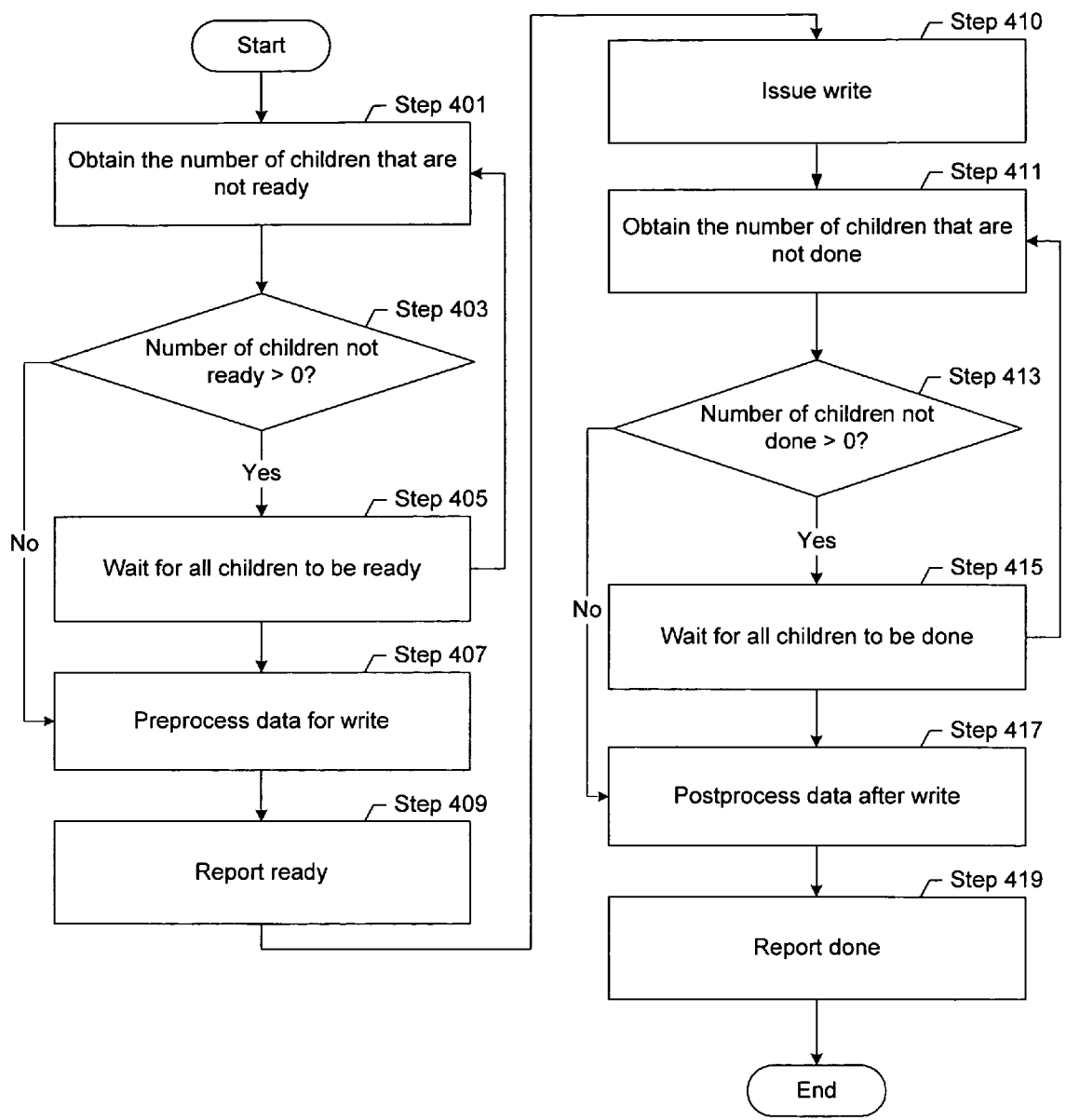
FIG. 4 shows a flow diagram of an I/O file system write command executing based on an I/O dependency graph in accordance with one or more embodiments of the invention.

FIG. 4 shows a flow diagram of an I/O file system write command executing based on an I/O dependency graph in accordance with one or more embodiments of the invention. Initially, the I/O command obtains the number of its children that are not ready (Step 401). In one or more embodiments of the invention, when an I/O command is defined as ready, preprocessing for the actual read or write command have completed. Preprocessing may include allocating disk or memory space, generating a pointer to the space being written to or read from, compressing data, generating a checksum from the data, etc.

In one or more embodiments of the invention, the number of children that are not ready are stored as a field in the I/O command, such as IO_CHILDREN_NOT_READY. The field corresponds to a counter that is decremented each time a child reports that it is ready. Next, the I/O command determines whether any children remain that are not ready (Step 403). If so, the I/O command must wait for all children to be ready (Step 405) before proceeding to the next step. Those skilled in the art will appreciate that other methods exist for keeping track of the readiness of an I/O command's children. For example, all children may be initially stored in an array labeled "not ready" and moved to a "ready" array as the children report their readiness.

Once all children are ready (i.e., number of children not ready=0), the I/O preprocesses data for the write (Step 407). As stated above, preprocessing includes preparations such as allocating disk or memory space, generating a pointer to the space being written to, etc. Once the preprocessing has completed (Step 407), the I/O command reports itself as being ready (Step 409). If the I/O command has a parent, the parent is informed of the I/O command's ready state. In addition, the parent of the I/O command may also be passed information pertaining to the I/O command's ready state, such as a pointer to the resources the I/O command is accessing. The parent can then use that information to prepare itself for being ready.

Once the I/O command is ready (Step 409), it can then prepare to execute the actual write to a resource. In one or more embodiments of the invention, the I/O command issues a write immediately after reporting ready (Step 410). Those skilled in the art will appreciate that in the case of a file system read, a data block cannot be read until its location is determined, which is provided by reading the indirect block pointing to the data block. Further, an indirect block cannot be read until its location is determined, which is provided by reading the block that points to the indirect block. As a result, a file system read command may first have to wait for its children to complete execution before proceeding with the actual read.

In one or more embodiments of the invention, the actual write to the file system (Step 410) may be accomplished by children that are created after the I/O command has reported ready (Step 409). For example, if the file system contained disk mirrors, the I/O command may reach its ready stage (Step 409), then generate and assign a child I/O to each disk to be written to. Each newly generated child I/O would then perform the actual write to its respective disk while the I/O command waits for all of its children to finish.

To determine whether all children have finished, the I/O command obtains the number of children that are not done (Step 411). In one or more embodiments of the invention, an I/O command is done when the I/O command has finished executing. Once the I/O command has obtained the number of children that are not done (Step 411), the I/O command checks to determine whehter any children have still not completed their execution (Step 413). As stated above, a read command may have to wait for all children to finish (Step 415) before issuing the I/O since the read command's execution may depend on the data the children have read to. On the other hand, a write (Step 410) may be more concurrent and can take place while waiting for children to complete execution (Step 415).

As with the ready state, in one or more embodiments of the invention, the number of children that are not done are stored as a field in the I/O command, such as IO_CHILDREN_NOT_DONE. The field corresponds to a counter that is decremented each time a child reports that it is done. Those skilled in the art will appreciate that other methods exist for determining how many children of an I/O command are done executing.

Once all children of the I/O command are done, the I/O command completes execution (Step 417) by postprocessing data after the write. Postprocessing after an I/O may include verifying a checksum, decompressing data, encrypting and decrypting data, etc. As stated above, a read command may execute its actual read at this point and continue with the postprocessing once the read is completed. Once the I/O command has completed execution, it reports done (Step 419). In one or more embodiments of the invention, if the I/O command has a parent, the parent is notified of the I/O command's done state. If the I/O command is the last child of the parent to finish, the parent can begin execution once it has received the report.

Figure 5B:
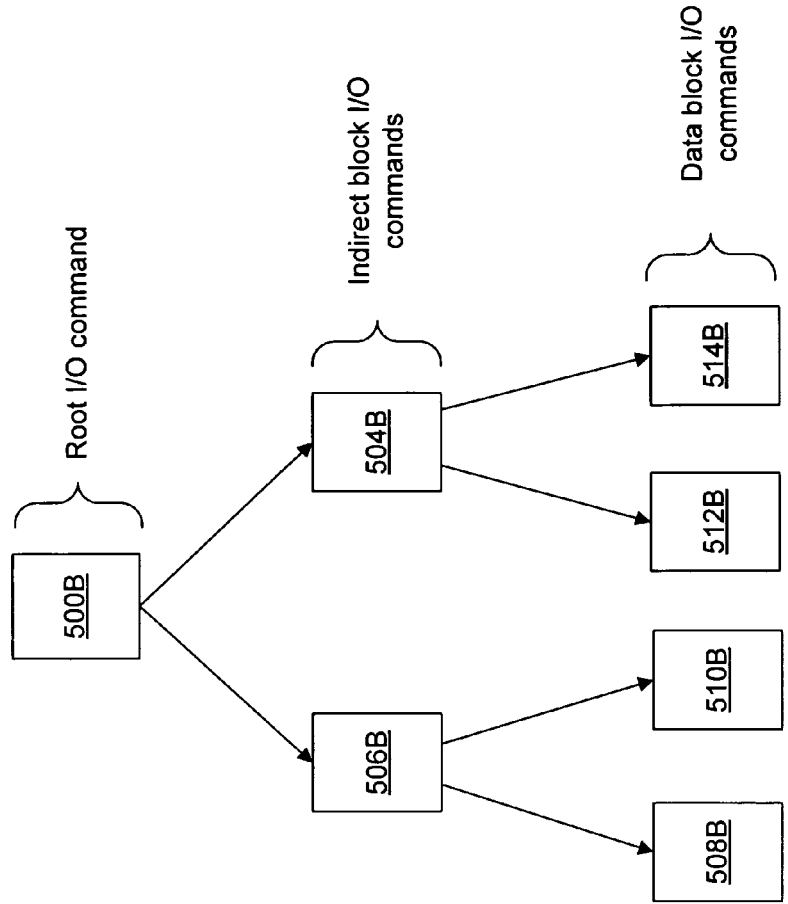
FIG. 5B shows a diagram of an I/O dependency graph in accordance with one or more embodiments of the invention.
Figure 5A:
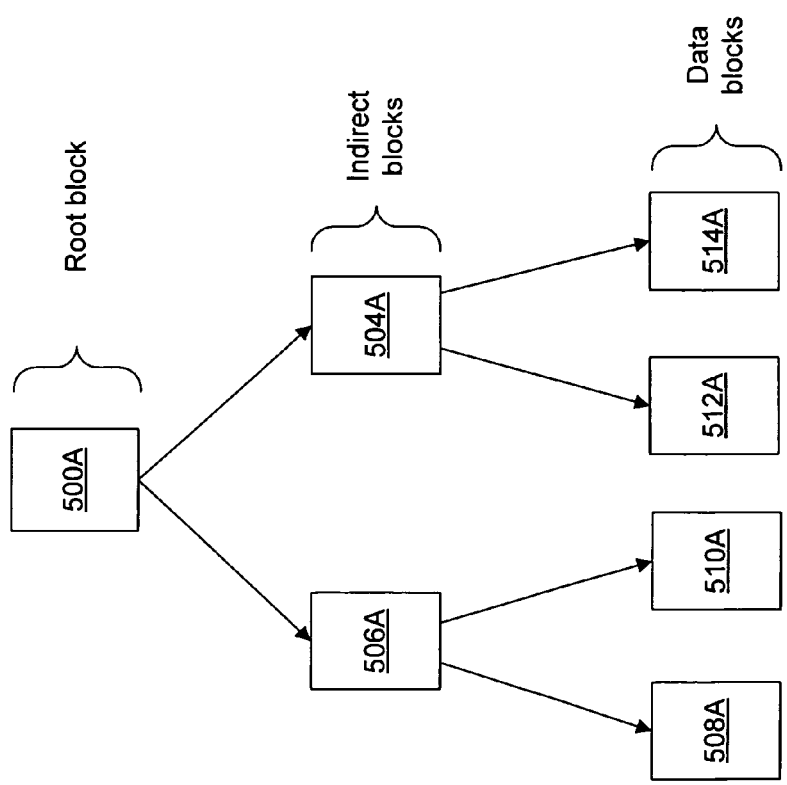
FIG. 5A shows a hierarchical data configuration for storing data blocks and indirect blocks in a file system in accordance with one or more embodiments of the invention.

FIG. 5A shows a diagram of a hierarchical data configuration for storing data blocks and indirect blocks in a file system. As shown in FIG. 5A, the hierarchical data configuration includes a root block (500A), indirect blocks (504A, 506A), and data blocks (508A, 510A, 512A, 514A). In one or more embodiments of the invention, FIG. 5A is a simplified version of FIG. 3, and the root block (500A), indirect blocks (504A, 506A), and data blocks (508A, 510A, 512A, 514A) have the same structure and function as their counterparts described in FIG. 3.

One skilled in the art will appreciate that in a write operation to the hierarchical data configuration of FIG. 5A, data blocks (508A, 510A, 512A, 514A) are written to first before the indirect blocks (504A, 506A), and that indirect blocks (504A, 506A) are written to first before the root block (500A). The order of write operations (data, indirect, root) is necessary because the indirect blocks (504A, 506A) contain pointers to data blocks (508A, 510A, 512A, 514A) and the pointers cannot be filled in until information about the data blocks (508A, 510A, 512A, 514A), such as addresses, checksums, etc. are known. Similarly, the root block (500A) contains information about the indirect blocks (504A, 506A) and cannot be written to until that information is provided.

One skilled in the art will appreciate that a read operation to the hierarchical data configuration of FIG. 5A will read blocks in reverse order from a write operation. In other words, the root block (500A) is read first to determine the location of the indirect blocks (504A, 506A), which are then read to determine the location of the data blocks (508A, 510A, 512A, 514A). Only when the location of the data blocks (508A, 510A, 512A, 514A) is known can the data blocks (508A, 510A, 512A, 514A) be read.

FIG. 5B shows a diagram of an I/O dependency graph in accordance with one or more embodiments of the invention. In one or more embodiments of the invention, an I/O dependency graph is mapped from the hierarchical data configuration for storing data blocks and indirect blocks in a file system. Specifically, FIG. 5B shows a diagram of an I/O dependency graph mapped from the hierarchical data configuration of FIG. 5A based on a write request to the hierarchical data configuration of FIG. 5A issued to the file system. In one or more embodiments of the invention, the I/O dependency graph of FIG. 5B is generated once a write request to the blocks of FIG. 5A is received by the file system.

As shown in FIG. 5B, the I/O commands in the I/O dependency graph include a root I/O command (500B), one or I/O commands associated with indirect blocks (504B, 506B), and one or more I/O commands associated with data blocks (508B, 510B, 512B, 514B). The root I/O command (500B) corresponds to the root block (500A) in FIG. 5A, the I/O commands associated with indirect blocks (504B, 506B) correspond to the indirect blocks (504A, 506A) in FIG. 5A, and the I/O commands associated with data blocks (508B, 510B, 512B, 514B) correspond to the data blocks (508A, 510A, 512A, 514A) of FIG. 5A. One skilled in the art will appreciate that although the I/O commands of FIG. 5B are a one-to-one mapping from the blocks of FIG. 5A, other mappings are also possible. For example, if the file system contained disk mirrors, the I/O dependency graph generated from the write request would contain a set of I/O commands for the blocks of each disk that are written to.

Continuing with FIG. 5B, the root I/O command (500B) points to subsequent I/O commands associated with indirect blocks (504B, 506B), which point to subsequent I/O commands associated with data blocks (508B, 510B, 512B, 514B). The root I/O command (400) is analogous to the root node of a tree; I/O commands associated with data blocks (508B, 510B, 512B, 514B) are analogous to leaf nodes of a tree. The root I/O command (500B) is the parent of the I/O commands associated with indirect blocks (504B, 506B), which are in turn parents of the I/O commands associated with data blocks (508B, 510B, 512B, 514B). Similarly, I/O commands associated with data blocks (508B, 510B, 512B, 514B) are children of the I/O commands associated with indirect blocks (504B, 506B), which are children of the root I/O command (500B). One skilled in the art will appreciate that several layers of access to indirect blocks may exist between the root I/O command (500B) and I/O commands accessing data blocks (508B, 510B, 512B, 514B). In addition, one skilled in the art will appreciate that the tree structure of the I/O dependency graph can be applied to various types of I/O commands and is not limited to I/O commands within a file system.

In accordance with one or more embodiments of the invention, children of an I/O command in the I/O dependency graph correspond to the I/O command's dependencies. Further, an I/O command cannot be executed until all children of the I/O command have completed execution. For example, referring to FIG. 5B, I/O commands associated with indirect blocks (504B, 506B) cannot be issued to persistent storage until their children, (i.e., I/O commands accessing data blocks (508B, 510B, 512B, 514B)) have issued to persistent storage.

In one or more embodiments of the invention, I/O commands corresponding to leaf nodes (508B, 510B, 512B, 514B) in the I/O dependency graph are executed concurrently before other I/O commands in the I/O dependency graph. Those skilled in the art will appreciate that, I/O commands associated with indirect blocks (504B, 506B) do not have to wait for all I/O commands associated with data blocks (508B, 510B, 512B, 514B) to finish executing before executing themselves. Specifically, the I/O command accessing indirect block (504B) can be issued to persistent storage once I/O commands accessing data blocks (512B) and (514B) have been issued to storage. I/O commands accessing indirect block (504B) do not need to wait on I/O commands accessing blocks (508B) and (510B) to complete. Once all dependencies of a specific I/O command have been resolved, that I/O command is allowed to begin execution without waiting on other I/O commands on which it does not depend.

Because the root I/O command (500B) depends, either directly or indirectly, on all other I/O commands in the I/O dependency graph(508B, 510B, 512B, 514B), the root I/O command (500B) executes last. For example, an I/O command sequence based on the I/O dependency graph of FIG. 4 may include the following: I/O commands associated with data blocks (508B, 510B, 512B, 514B) may be started concurrently because they have no children, or dependencies. The I/O command associated with data block (508B) finishes, followed by the I/O commands associated with data block (512B) and data block (510B). Because both I/O commands associated with data block (508B) and data block (510B) have finished, I/O commands associated with indirect block (506B) can begin execution and may even finish before the I/O command associated with indirect block (504B) starts. In the meantime, once the I/O command associated with data block (514B) is done, the I/O command associated with indirect block (504B) can begin execution. Once both the I/O commands associated with indirect blocks (504B) and (506B) have completed, the I/O commands associated with indirect block (500B) can then execute and complete the I/O sequence.

Embodiments of the invention have one or more of the following advantages. Embodiments of the invention can obtain the maximum amount of I/O parallelism theoretically possible given the logical relationships between the I/O commands that need to be performed. Further, embodiments of the invention allows all I/O requests to be issued without stalling threads.

Figure 6:
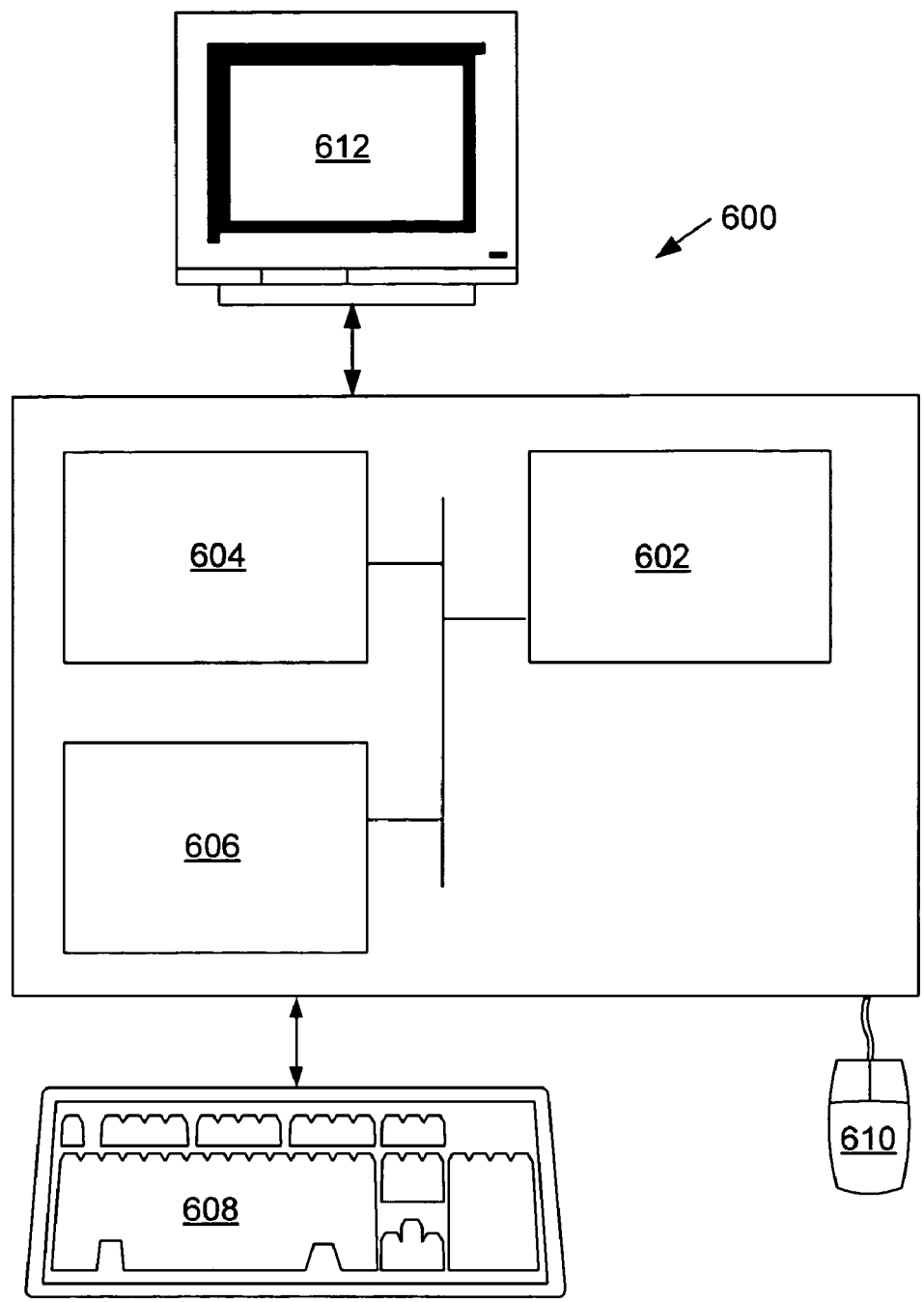
FIG. 6 shows a computer system in accordance with one ore more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., file system, root block, indirect block, data block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a selected input/output (I/O) command from a plurality of I/O commands based on a dependency graph of I/O commands, comprising:
building the dependency graph of I/O commands, wherein the dependency graph is built by requiring all children of the selected I/O command to be ready before the selected I/O command is ready; and
executing the I/O command based on the dependency graph, wherein execution of the selected I/O command is completed when all of the children of the selected I/O command finish execution.

2. The method of claim 1, wherein the method for selecting an I/O command based on a dependency graph of I/O commands is used to facilitate the operation of a file system.

3. The method of claim 1, wherein the plurality of I/O commands is selected and executed in parallel based on the dependency graph.

4. The method of claim 1, wherein instructions for readying the selected I/O command are executed after all children of the selected I/O command are ready.

5. The method of claim 1, wherein instructions for completing the selected I/O command are executed after all children of the selected I/O command are finished executing.

6. A system for executing a selected input/output (I/O) command from a plurality of I/O commands based on a dependency graph of I/O commands, comprising:
a file system configured to:
build the dependency graph of I/O commands, wherein the dependency graph is built by requiring all children of the selected I/O command to be ready before the selected I/O command is ready; and
execute the I/O command based on the dependency graph, wherein execution of the selected I/O command is completed when all of the children of the selected I/O command finish execution.

7. The system of claim 6, further comprising the plurality of children of the selected I/O command based on the dependency graph of I/O commands.

8. The system of claim 6, wherein the system for executing a selected I/O command based on a dependency graph of I/O commands is used to facilitate the operation of a file system.

9. The system of claim 6, wherein the plurality of I/O commands is selected and executed in parallel based on the dependency graph.

10. The system of claim 6, wherein the dependency graph of I/O commands comprises:
a plurality of I/O commands; and
a plurality of edges connecting the I/O commands.

11. The system of claim 10, wherein the plurality of edges connecting the I/O dependencies comprise directed edges.

12. The system of claim 10, wherein the dependency graph of I/O commands is mapped from a hierarchical data configuration for storing data blocks and indirect blocks in a file system.

13. A computer usable medium having computer readable program code embodied therein for causing a computer system for executing a method for executing a selected input/output (I/O) command from a plurality of I/O commands based on a dependency graph of I/O commands, comprising:

building the dependency graph of I/O commands, wherein the dependency graph is built by requiring all children of the selected I/O command to be ready before the selected I/O command is ready; and executing the I/O command based on the dependency graph, wherein execution of the selected I/O command is completed when all of the children of the selected I/O command finish execution.

14. The computer usable medium of claim 13, wherein the method for executing a selected I/O command based on a dependency graph of I/O commands is used to facilitate the operation of a file system.

15. The computer usable medium of claim 13, wherein a plurality of I/O commands is selected and executed in parallel based on the dependency graph.

16. The computer usable medium of claim 13, wherein instructions for readying the selected I/O command are executed after all children of the selected I/O command are ready.

17. The computer usable medium of claim 13, wherein instructions for completing the selected I/O command are executed after all children of the selected I/O command are finished executing.

* * * * *